Aug. 19, 1924.
R. R. SWANEY
1,505,172
RADIATOR CORE FORMING MACHINE
Filed June 3, 1922   6 Sheets-Sheet 6
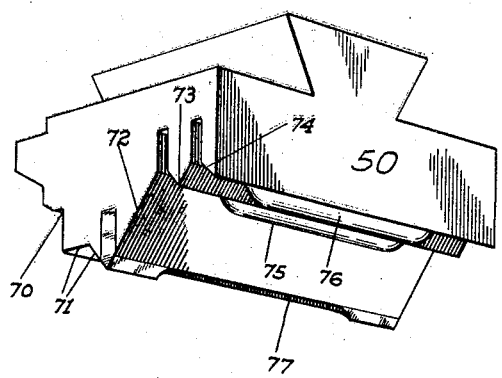
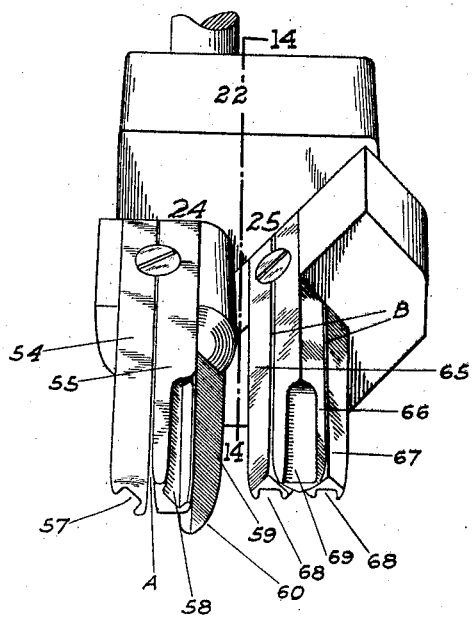
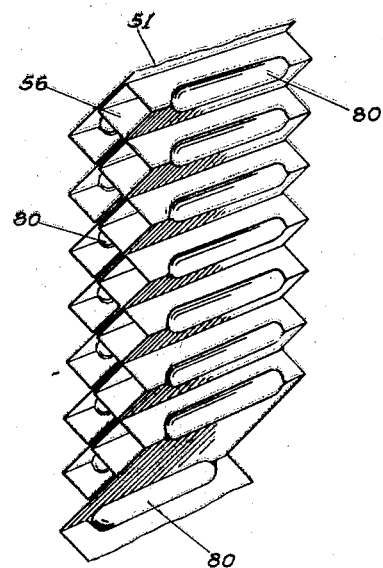
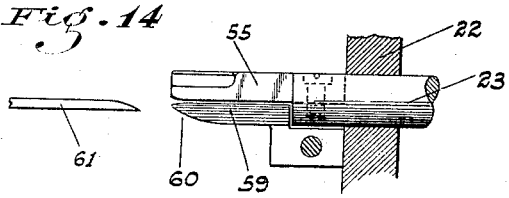
INVENTOR.
Robert R. Swaney
BY
ATTORNEY Patented Aug. 19, 1924.

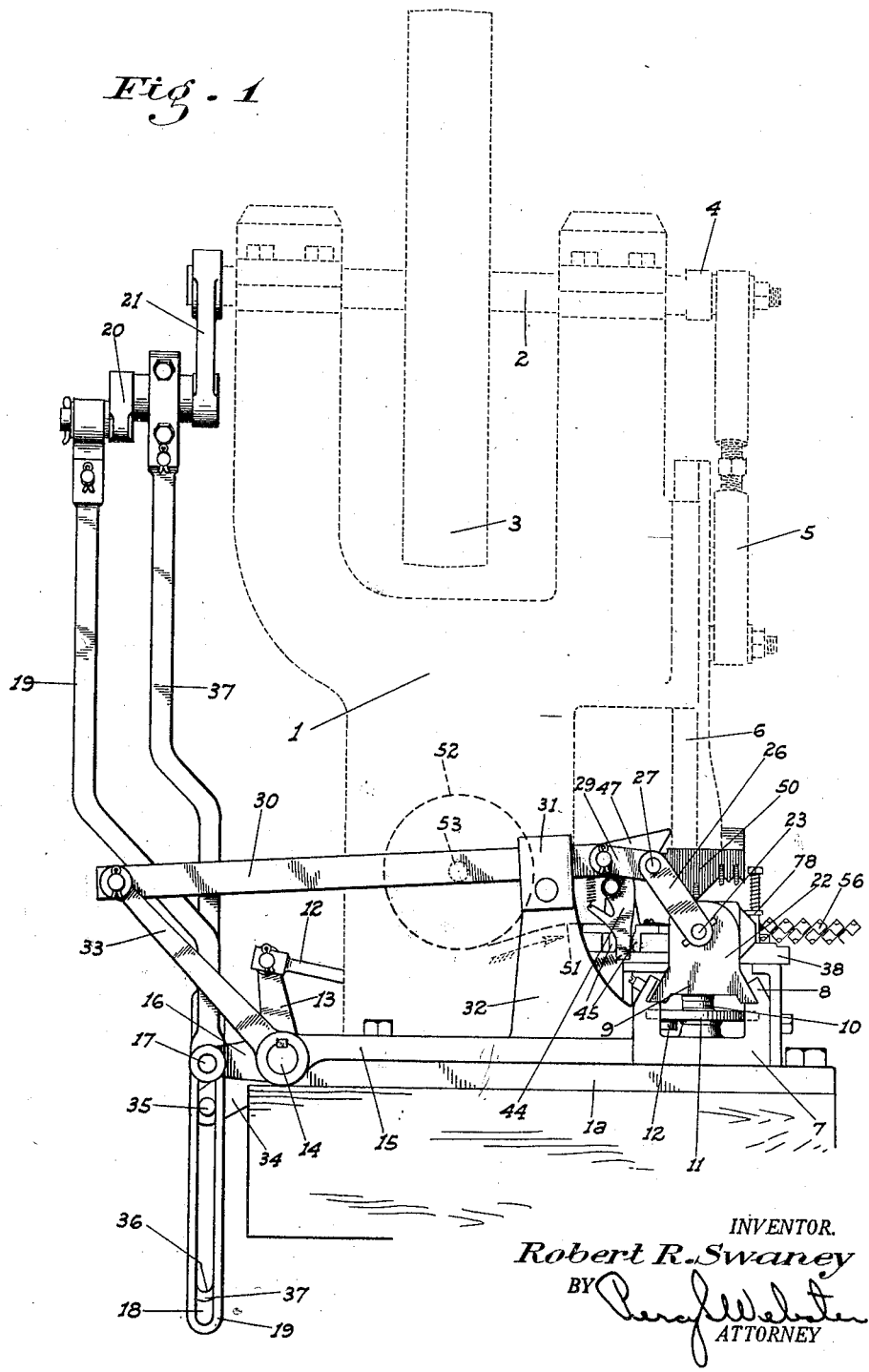

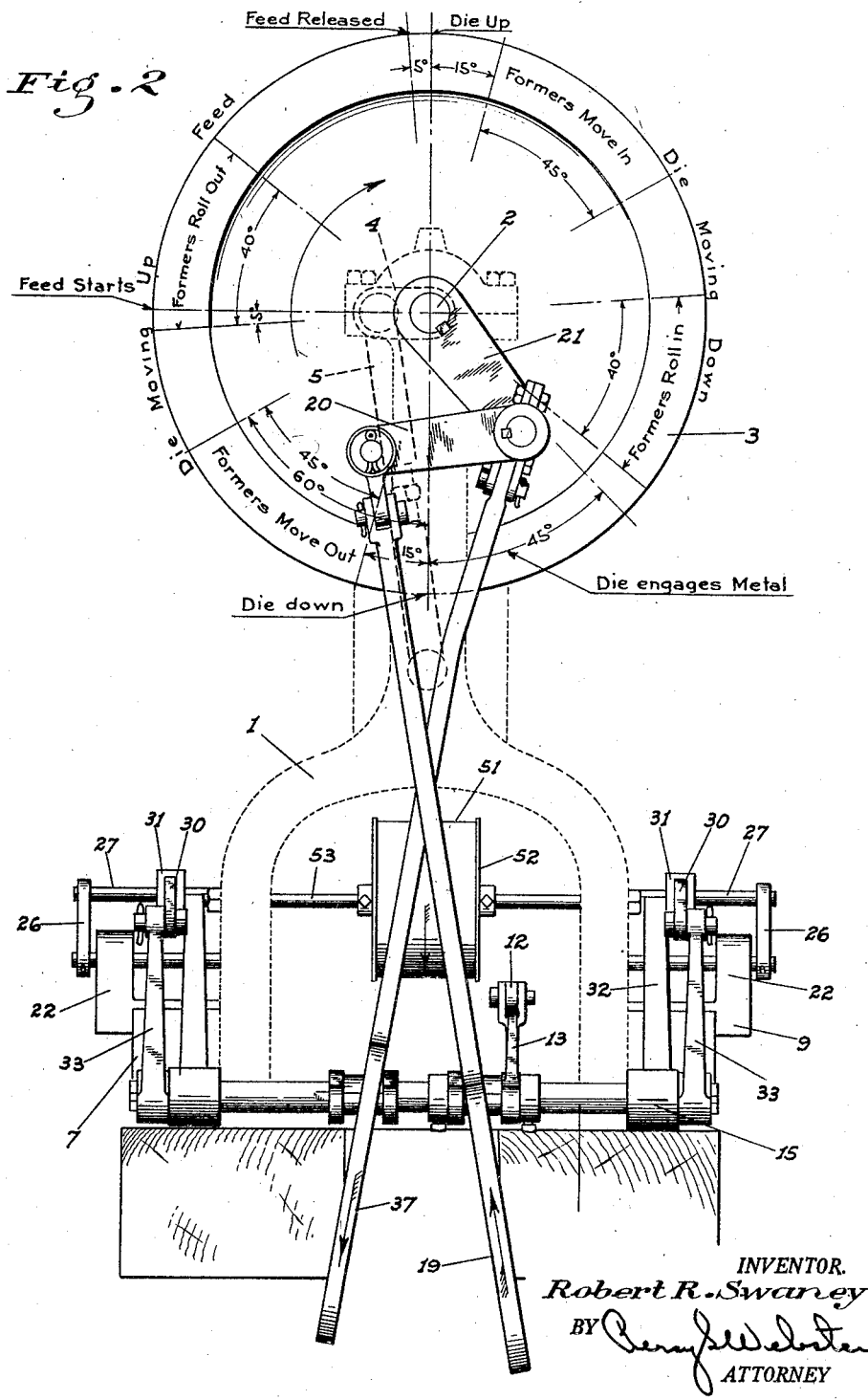

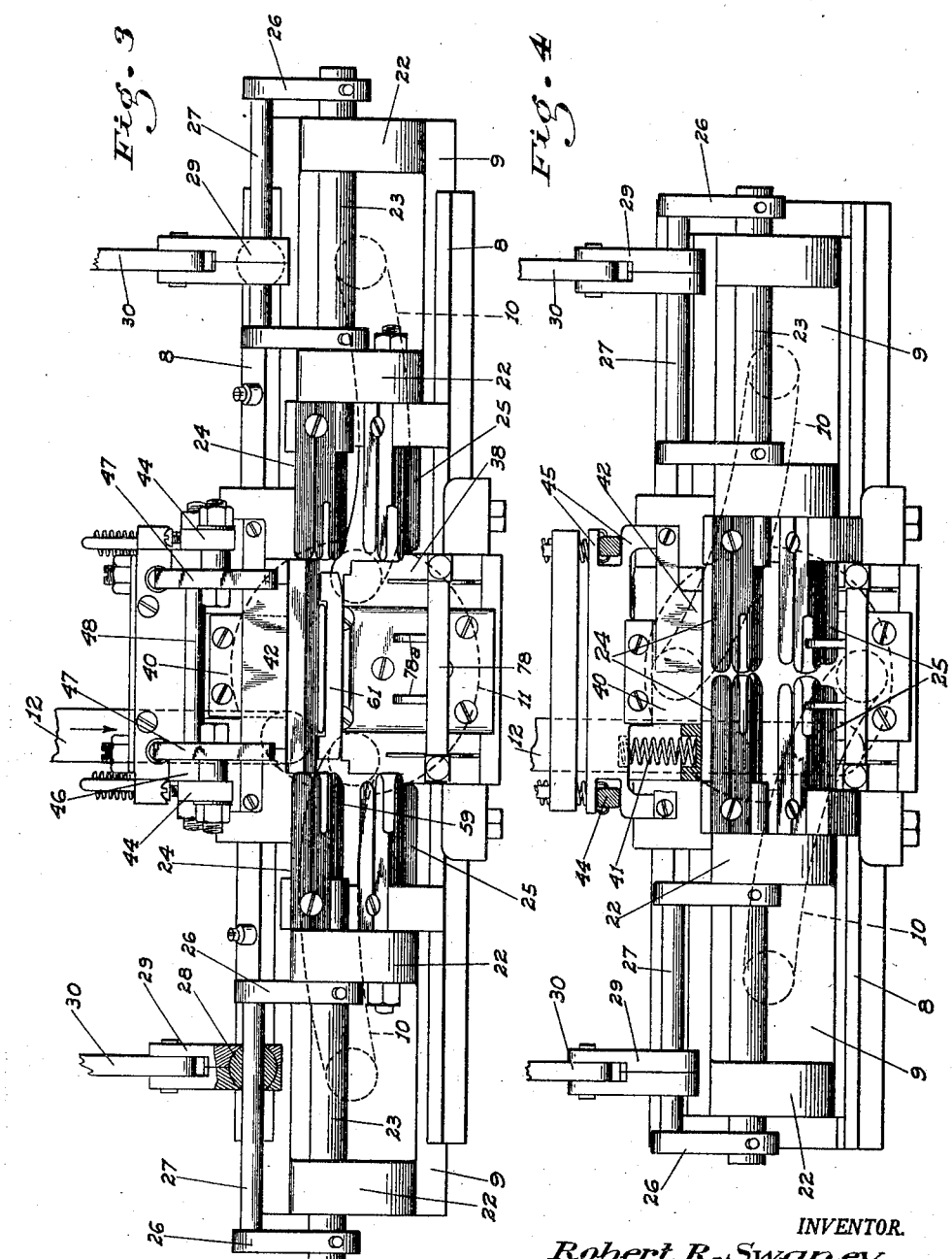

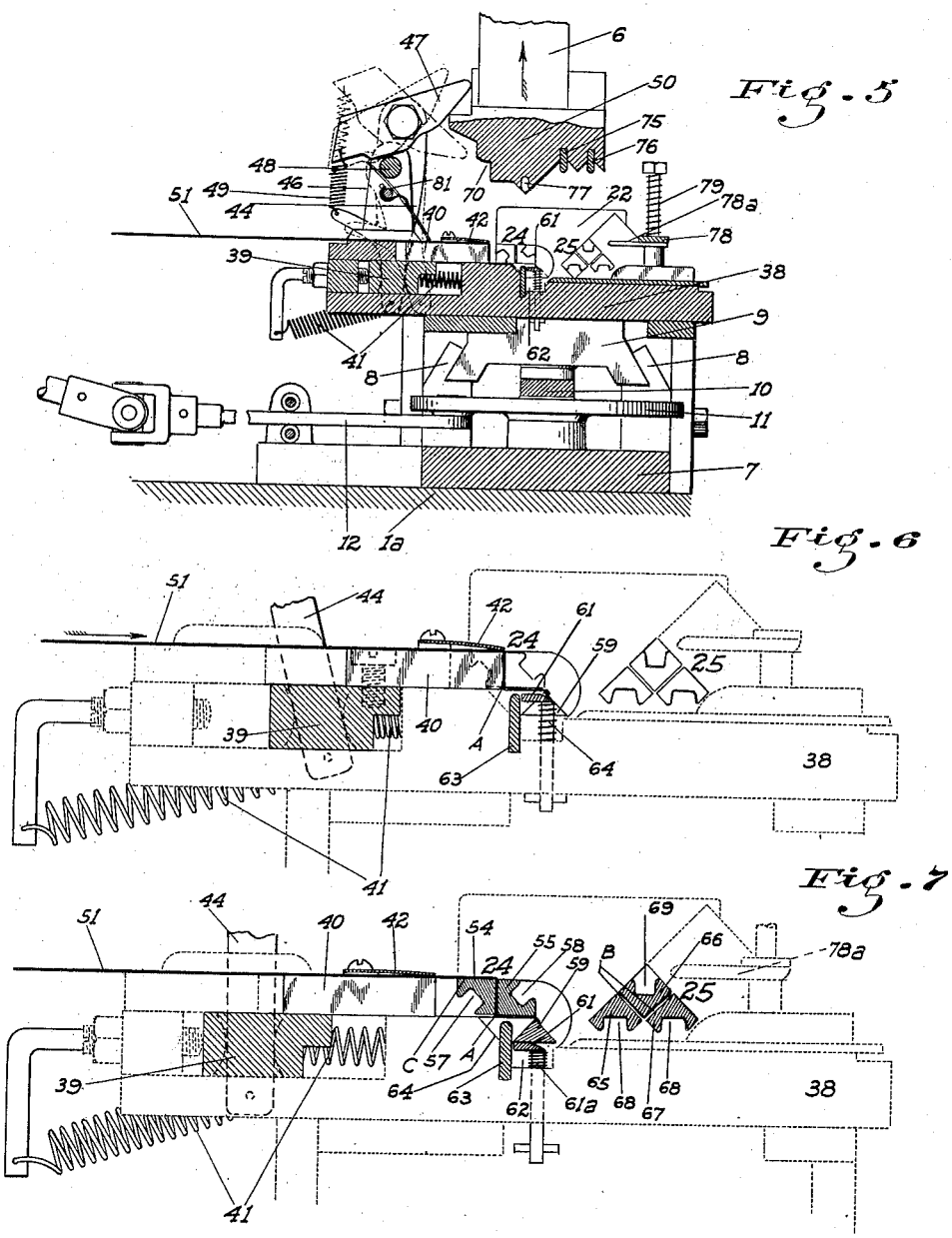

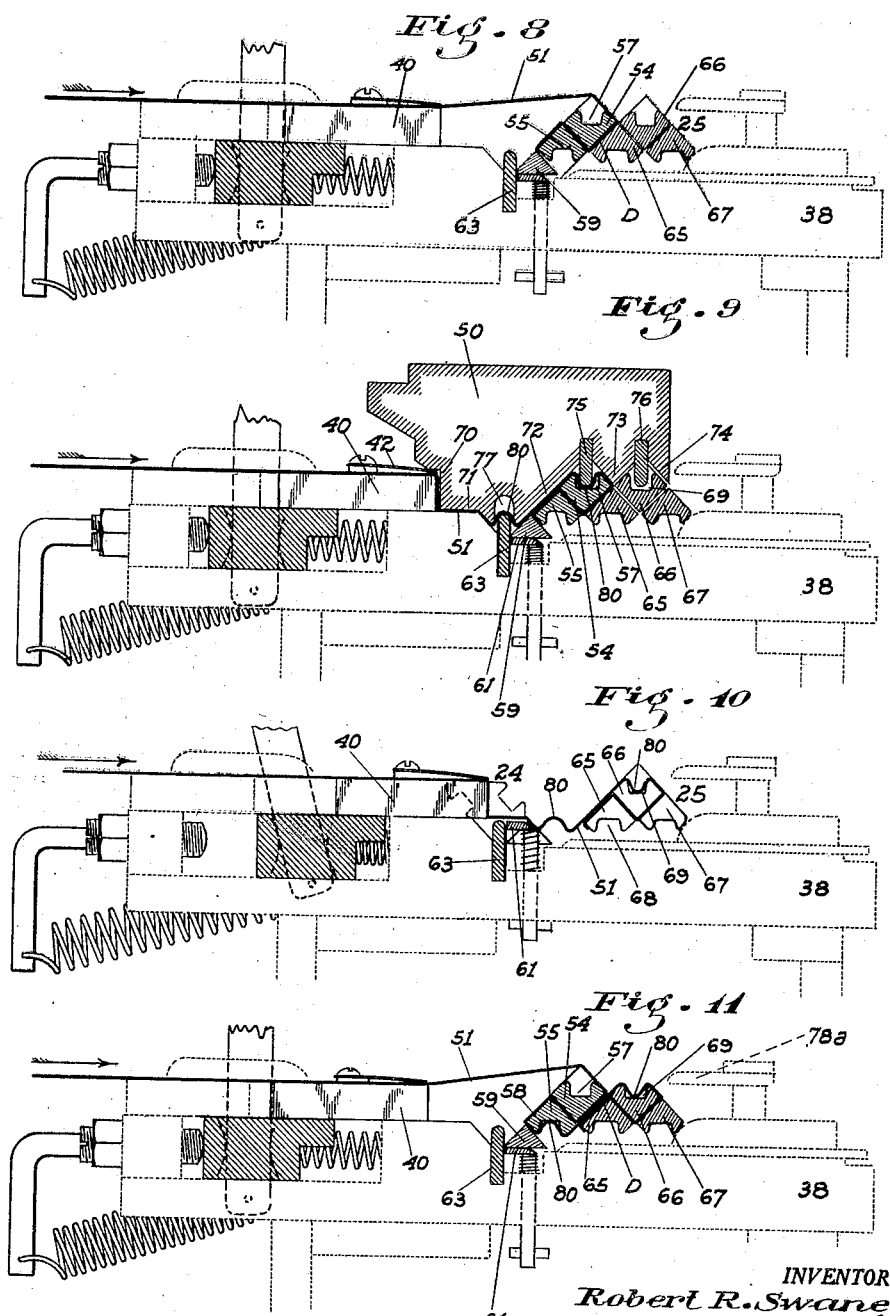

1,505,172

UNITED STATES PATENT OFFICE.

ROBERT ROY SWANEY, OF SACRAMENTO, CALIFORNIA.

RADIATOR-CORE-FORMING MACHINE.

Application filed June 3, 1922. Serial No. 565,579.

*To all whom it may concern:*

Be it known that I, ROBERT R. SWANEY, a citizen of the United States, residing at Sacramento, county of Sacramento, State of California, have invented certain new and useful Improvements in Radiator-Core-Forming Machines; and I do declare the following to be a full, clear, and exact description of the same, reference being had to the accompanying drawings, and to the characters of reference marked thereon, which form a part of this application.

This invention relates to improvements in sheet metal bending machines, the principal object of the invention being to provide a bending machine especially adapted to form the radiator-core or cell structure shown in my Patent No. 1,417,783, dated May 30th, 1922.

Another object is to provide a machine which will form a double row of diagonally disposed core-cells automatically and for as great a length of structure as may be desired, once the sheet-metal is initially fed into the plane of action of the dies and formers or mandrels, and in such a manner that the structure when fed out of the machine is in a finished condition, ready to be alined with similar core members and soldered together to form a complete radiator.

The machine is also capable of very rapid operation, so that the cost and time of making the radiator cores is reduced to a minimum.

A further object is to provide a bending and forming structure which may be made as a unit separate from a die press, and adapted to be mounted or installed on a standard press of suitable form.

These objects I accomplish by means of such structure and relative arrangement of parts as will fully appear by a perusal of the following specification and claims.

In the drawings similar characters of reference indicate corresponding parts in the several views:

Figure 1 is a side outline of a punch or die press showing the mounting or installation of my improved bending or forming apparatus in connection therewith, the parts being in a position at which the feeding of the metal blank is about to begin.

Fig. 2 is a rear end outline of the assembled device with the parts in the same position.

Fig. 3 is a top plan view of the feeding and lower forming mechanism, assembled, and with the mandrels or formers drawn out or apart.

Fig. 4 is a similar view, with the mandrels moved in and together.

Fig. 5 is a sectional view of the forming and feed mechanism, the parts being in position as at the start of the feed.

Fig. 6 is a similar view, more or less diagrammatic, showing the position of the mandrels or formers, and the feed mechanism, at the completion of the feed.

Fig. 7 is a similar view, indicating the position of the parts after the release of the feeding members and the moving together of the formers.

Fig. 8 is a similar view, showing the oscillating formers rolled over against the fixed formers, with the metal therebetween, and just prior to the descent of the die head.

Fig. 9 is a similar view, showing the diehead at its point of lowest descent.

The foregoing views show in direct sequence the actual steps in the operation of the forming mechanism.

Fig. 10 is a view similar to Fig. 6, the formers having been drawn apart, the oscillating formers rolled out or over back to their normal positions, and the feed having been advanced for another cycle of operations.

Fig. 11 is a view similar to Fig. 8 with the formers again moved in, and the oscillating formers rolled over adjacent the fixed formers, ready for the descent of the die head.

Fig. 12 is a perspective view of the die head, detached.

Fig. 13 is an enlarged perspective view of one set of the formers or mandrels, detached.

Fig. 14 is a cross section on the line 14—14 of Fig. 13.

Fig. 15 is a perspective view of a portion of a complete core or cell structure as turned out by the machine.

Referring now more particularly to the characters of reference on the drawings, the numeral 1 denotes the frame of a die or punch press, having journaled therein a suitable distance above the base 1ª of said frame a shaft 2 carrying a fly wheel 3.

On the forward end of this shaft is a crank 4 having a connecting rod 5, adjustable as to length, pivoted thereto and to a cross head 6 vertically slidably mounted on the frame 1.

These features are standard with presses of this character, and of themselves form no part of my invention.

Removably mounted on the base 1ª under the cross head 6, in front of the frame 1 and transversely of the line of the shaft 2 is an auxiliary base 7 slidably mounted lengthwise in raised guide members 8 formed therewith are opposed and symmetrical heads 9, which are arranged for opposed movement relative to each other, and in unison, by means of arms 10 connected thereto and to opposed points on a turntable or disc 11 pivotally mounted on the base 7 under the heads 9 centrally therebetween. This disc is rotated a predetermined distance and at predetermined times by means of a flexibly jointed connecting rod 12 pivoted thereto and extending to a similar connection with a vertical arm 13 turnably mounted on a shaft 14 extending transversely of the shaft 2 and pivoted in extensions 15 of the base 7 (see Figs. 1 and 2). This arm 13 is rocked back and forth once every revolution of the shaft 2, and remains stationary between such periods of movement, by means of an arm 16 fixed with the arm 13 and having a pin or roller 17 passing through a slot 18 in a vertical bar 19, the upper end of which is pivoted on the end of a crank arm 20, formed as an offset and angled extension of, and fixed to, a crank 21, fixed on the adjacent end of the shaft 2. The length of the slot 18 is such that the pin 17 is struck and the arm 16 raised before the crank 20 reaches the top of its stroke, and similarly the pin is again struck and its arm lowered before the said crank reaches the bottom of its stroke.

Projecting upwardly from both ends of the sliding heads 9 (between which there is always a considerable space) are blocks 22, in which, adjacent the transverse edges of the heads nearest the frame 1, are journaled turnably mounted rods 23, in alinement with each other, on the inner ends of which, that is on the ends adjacent each other and inwardly of the adjacently facing blocks 22, are fixed the oscillating mandrels or formers 24, symmetrical with each other, and which are described more in detail hereinafter.

Fixed onto the adjacent ones of the blocks 22, and projecting therefrom in the same direction as the mandrels 24, but positioned forwardly thereof, are the fixed mandrels or formers 25, symmetrical with each other, and likewise described more in detail hereinafter.

The extent of movement of the sliding heads 9, with which the blocks 22 and mandrels are mounted, is so arranged that when the heads move toward each other, the mandrel-sets abut, and when the heads move apart, the adjacent ends of the mandrels are spaced apart to an extent slightly greater than the width of the metal being formed as cores.

The oscillating mandrels or formers 24 are arranged to be rotated through an arc of 135° in unison twice for every revolution of the shaft 2—once in each direction—, one such movement taking place while the heads 9 and mandrel-sets are adjacent each other, and the other after the mandrels are moved apart.

The means used to accomplish this movement is as follows:

Fixed to the shafts or rods 23 at spaced points on each are arms 26, connected by round rods 27, parallel to the shafts 23. Slidably mounted on each rod 27 is a ball 28 (see Fig. 3) seated or socketed in a horizontal split-link member 29 which is flexibly connected to a horizontal lever or bar 30 (see Fig. 1) which, adjacent the said link slidably passes through a guide member 31 swivelly mounted with a horizontal and transverse axis onto a bracket 32 projecting upwardly from the base-extension 15.

The rear ends of the bars 30 are pivoted to the outer ends of arms 33, which are fixed onto the shaft 14.

A shorter arm 34 having a transverse pin 35 on its outer end projects from and is fixed to said shaft, the pin passing through a slot 36 in a vertical bar 37, the upper end being pivoted to the outer end of the crank arm 21. As is the case with the bar 19 and arm 16, the slot 36 is of such a length that the pin 35 will only be struck, and its arm raised or lowered, at periods in the rotation of the shaft 2, near the top and bottom of the stroke of the crank arm, such periods being arranged to be at different times from the time of actuation of the arm 16.

Positioned between the sliding heads 9, and under the plane of the formers or mandrels, is a table 38 immovably fixed and supported by the base 7. Slidably mounted in this table for movement in a horzontal plane longitudinally of the shaft 2, or at right angles to the direction of movement of the sliding heads 9, is a bar 39 having a feed plate 40 fixed thereon, tension and compression springs 41 acting thereon to normally cause the bar and plate to be held at that end of the limit of travel farthest from the heads 9 and mandrels. The upper surface of the feed plate is substantially on a level with the upper edges of the oscillating formers 24 when the latter are in their initial or at rest position, away from the fixed formers 25 as shown in Figs. 5, 7, etc., while the height of the plate above the table 38 is equal to the width of one of the former-fingers.

Mounted with and above the plate 40 is a flexible guide plate 42, extending transversely of the plate 40 and reaching to the outer or forward edge of the plate 40, the plate 42 being spaced from the plate 40 just sufficient to allow the metal to be formed being passed therebetween.

The feed plate 40 and bar 39, which members are to all intents and purposes a single unit, are moved forward against the resistance of the springs 41 at a predetermined period in the rotation of the shaft 2, and only once for each revolution, by means of arms 44 passing between guides 45 formed with the bar 39 beyond the side edges of the table 38 (see Fig. 1) which arms are pivoted intermediate their ends in suppports 46 projecting upwardly from and rigidly fixed to the table 38 (see Fig. 5). Pivoted onto the arms 44 about the pivotal mounting of the latter with their supports are dogs 47, the under sides of which, to the rear of their connection with the arms, normally bear against a rod 48 extending between the supports 46, tending to remain so engaged by springs 49 acting on the dogs.

The forward ends of the latter project to be engaged by the upper edge of a die head 50 fixed on the lower end of the cross head 6.

The position of the lugs is so arranged relative to the die head and to its travel that when the head rises to a point about midway of its upper stroke, the dogs will be engaged from there to about the top of the stroke of the head, causing the dog to be swung upwards, thus moving the upper ends of the arms 44 to the rear, and the lower ends forward, imparting a similar movement to the feed plate 40.

When the head 50 is about at the top of its stroke, the dogs have been moved to such a vertical angle that they no longer engage the head, and the latter moves therepast, and the lugs slip under the head. The pressure on the lugs being thus released, the springs 41 then at once act to return the feed plate to its normal position to the rear.

As the die head then moves on its down stroke, the lugs double up forwardly, like a jack-knife, without imparting any movement to the arms 44 or feed plate, until as the head moves below the dogs the latter spring clear of the head, and by reason of the springs 49, resume their normal positions, ready to be again engaged by the head with its next up-stroke.

The metal 51 to be formed is preferably arranged in the form of a roll 52 (see Figs. 1 and 2) freely mounted on a rod 53 fixed in the frames 1 or elsewhere and positioned in rearward alinement with the feed plate 40.

The outer end of the roll of metal is then, prior to the commencement of the forming operations, passed over the plate 40 and fed between the plates 40 and 42, so that the end of the metal projects beyond the front edges of said plates somewhat.

The formers or mandrels, and their relation to each other, will now be described.

The oscillating formers 24 each consists of a pair of parallel fingers 54 and 55, fixed together, and of square cross section of an area equal to the interior area of a core-cell 56 (see Fig. 15) to be formed.

The upper faces of these fingers, when these formers are in their rearward or at rest position, lie in a common horizontal plane which, as previously stated, is on a line with the upper surface of the feed plate 41.

All sides of the two fingers then of course lie in vertical and horizontal planes, and the fingers are permanently spaced apart a distance very slightly greater than the thickness of the metal 51, as shown at A.

The rear finger 54, for a certain distance from its free end is provided with a substantially straight-sided groove 57 common to portions of the rear and under sides, and which is therefore symmetrically diagonal to said sides, and cuts off the lower and rear edge, as plainly shown in Figs. 7, 13 etc., a diagonal line bisecting the groove from the corner of the finger making a 45° angle with the adjacent sides of the finger.

The forward finger 55 has a similarly shaped groove 58, which however is positioned diagonally of the upper and forward sides of said finger, and hence is oppositely disposed to the groove 57 of the outer finger.

The axis of turning of the oscillating formers on the line of the lower right hand edge of the finger 55, and coincident with this line or spaced from the edge of the finger sufficient to enable the thickness of the metal to pass therebetween, is the apex edge of fixed triangular fingers 59, whose sides are each 45° with the base or bottom sides thereof, which latter are horizontal.

The bottoms of these triangular fingers slope upwardly toward the apex adjacent their outer ends, as shown at 60 in Fig. 13 so as to ride onto and depress a plate 61 which extends lengthwise of the fingers and is mounted in a depression or recess 62 in the table 38 when the sliding heads and parts connected thereto are moved inwardly and together (see Figs. 5, 7 etc.). Just behind or to the rear of the plate 61 and extending lengthwise thereof is fixed a narrow and vertical ridge member or male die 63, whose upper edge is rounded and slightly above the upper face of the plate 61 when the latter is in its normal or raised position, which position is maintained when the fingers 59 are moved clear of said plate by springs 61ª acting thereon (see Figs. 6, 7 etc.).

To the rear of the member 63, the upper face of the table 38 slopes up from a point below the upper edge of said member, or from the bottom edge of the rear side of the triangular fingers 59, with a 45° slant as shown at 64, so that the vertical member 63 bisects the corner and angle between the said side of the fingers 59 and the sloping portion of the table.

The fixed formers or mandrels 25 each consists of three square fingers 65, 66 and 67, the same size as the fingers 54 and 55. They are disposed as a pyramid or in triangular relation to each other, with their opposed or diagonal edges or corners lying in horizontal and vertical planes and with the apex of the triangular formation uppermost from each other.

They are spaced apart from each other as at "B" (Figs. 7, 13, etc.) a distance sufficient to allow the thickness of the metal sheet 51 to pass therebetween, one thickness (see Fig. 10) being passable between fingers 65 and 66, and three between fingers 66 and 67.

The fingers 66 forms the apex of the triangle, with the finger 65 forming the lower rear portion thereof, on the side nearest the oscillating formers, while the finger 67 forms the forward and lower portion of the triangle.

The outer faces of the fingers 65 and 67 are in alinement with the corresponding faces of the finger 66, and the continuous inclined surfaces thus formed are set at a 45 degree angle with a vertical plane.

The under sides of the fingers 65 and 67 are cut away from their outer ends to form grooves 68 of the same shape as the grooves 57 and 58, but positioned with their bottoms in a common horizontal plane, and vertical lines bisecting the same passing through the intersecting points of said under sides.

The upper sides of the finger 66 are cut away for the same distance from their outer ends to form a similar shaped groove 69, whose sides lie in a vertical plane, and a vertical line bisecting which passes through the line of intersection of said upper sides.

The fixed formers 25 as a unit are so arranged with relation to the oscillating formers 24 that when the latter are rolled over through their total arc of movement, which as previously stated is 135°, the finger 54 of each oscillating former then lies with its formerly upper face "C" (see Fig. 7) adjacent the outer side of the corresponding finger 65, with just sufficient clearance as at D to receive three metal-thicknesses therebetween. (See Fig. 11.)

When the former-sets are in this position, it will be noted that the groove 57 of the finger 54 is then uppermost and in horizontal alinement with the groove 69 of the finger 66, while the groove 58 of the other finger 55 is then facing downwardly to the rear of the groove 57, and in horizontal alinement with the grooves 68 (see Figs. 8, 9 and 11).

It will also be noted that the rear faces of the fingers 54 and 55 then form an unbroken surface with the rear face of the triangular finger 59, and that the opposite upper face of the finger 54 includes an angle of 90° with the adjacent face of the finger 66, a line bisecting which angle lies in a vertical plane.

The adjacent or free ends of all the fingers of both former sets are slightly reduced in size, as shown in Fig. 13, so that the fingers will slide easily into the rectangular cells formed when the formers are moved in, so as to guide the metal into the spaces therebetween without danger of catching and crumpling the edges of the metal, since the latter is easily bent and somewhat flexible and is apt during the operation of the machine to vibrate or move slightly out of alinement with the fingers when the latter are moved out to clear the metal.

The lower face of the die head 50 is provided at its rear end with a right-angle and transverse indentation or shoulder as at 70, the vertical face of which is positioned to pass down closely adjacent the outer end of the feed-plate 40 when the latter is retracted (see Fig. 9) while the upper and horizontal face of the shoulder is adapted to bear down somewhat on the guide plate 42 when the head is at the bottom of its stroke.

Beyond and forward of the shoulder 70 the said face of the head is formed to lie against the adjacent upper and horizontal face of the table as shown at 71; to lie against the adjacent inclined faces of the fingers 59, 55 and 54 when the latter fingers are moved or rolled over to lie adjacent the fixed formers as shown at 72; to fit into the angle formed by and between the fingers 54 and 66 as shown at 73; and to lie against the outer and forward face of the fingers 66, as shown at 74, all of which will be plainly evident in Fig. 9 especially.

The head 50 also carries vertical male dies 75 and 76 adapted to project into the grooves 57 and 69, and a groove 77 to fit over the fixed die member 63.

Beyond the fixed formers is a transverse plate 78 having projecting guide fingers 78ª, yieldably held down by spring means 79 (see Figs. 3-5 etc.) these fingers being positioned to receive thereunder the finished structure as it is fed from the machine with the operation thereof.

The operation of the device is as follows:

Assume that a start is made just at the inception of the forward feeding of the metal strip 51.

This starts substantially 90° from the upper end of the die-head stroke and while the head is moving up. At this point, which is the position shown on the main figures of the drawings, the dog 47 is engaged by the head 50 and raised, causing, as previously stated, the arms 44 to be angled forwardly at the lower ends, and the feed plate 40 to be moved forward, carrying the metal strip forward also. The parts are so designed that when said plate has moved forward to its full extent its front edge will be in vertical alinement with the slot or space A between the oscillating former fingers when the latter are seated in their normal or at rest position (see Fig. 6).

About 5° before the head 50 reaches the upper end of its stroke, the feed-controlling dog 47 is released, and the feed plate, drawn by the springs 41, snaps back to its normal position, where it will remain until the head is again on its upper stroke after making three-quarters or more of a revolution. The metal strip however remains projected beyond the front edge of the plate 40, due to the influence of a spring-pressed and rearward slanting plate 81 mounted above the plate and bearing on the metal strip.

It may here be stated that at the outset of operations I preferably project the metal strip beyond the plate 40 by hand sufficient to allow the projected portion to be bent down on the first two members of the bottom die as shown in Fig. 5, when the head descends and the portions 70—71 thereof move into engagement with the bottom die. Assume then this to have been done, and the metal then in the position shown in Fig. 6.

The head 50 after the release of the feed, passes onto its downward stroke, and at a point about 15° from the upper dead center of the crank 4 one end of the slot 18 in the arm 19 engages the pin 17, and by reason of the movable parts to which it is connected, pushes the connecting rod or arm 12 and causes a rotation of the disc 11. This causes the arms 10 to be drawn together imparting similar movement to the sliding heads 9 and the formers mounted thereon until the latter abut, the fingers 54 engaging the projected strip 51 and the two bends thereof previously formed passing under the fingers 54 and 55 as shown in Fig. 7. This inward movement of the sliding heads and formers occupies about 45° of rotation of the shaft 2, and is terminated by the arm 19 having reached the top of its stroke, which position, owing to the offset arrangement of the arm 20 to which it is connected, will take place considerably before the arrival of the other arm 37, to which the crank arm 21 is connected, at the same position.

It will be noted that no movement is imparted to the links 29 and arms 30, nor is any lateral strain placed thereon during the moving in and out of the sliding heads, due to the employment of the socketed balls 28 in the links 29, which form the bearing bushings for said links on the shafts 27, and while allowing of a good sliding fit with the shafts, positively prevent any binding when the shafts are slid therethrough.

After a certain interval of rotation, during which time the head 50 is continuously moving down, the lower end of the slot 36 in the arm 37, moving up, engages the pin 35 in the arm 34, causing the shaft 14 to be rotated and the arm 30 to be shifted forward. This action rocks the arms 26 forward, and the shafts 23 are rotated, causing the oscillating formers to be rolled over and toward the fixed formers, the formers then assuming the position shown in Fig. 8. With this movement of said formers, the strip 51, being engaged between the fingers 54 and 55, is drawn further from its spool 52 without moving the feed plate 40, and becomes wrapped around the sides of the fingers 54, a certain portion being held between the fingers 54 and the adjacent faces of the adjacent fingers 65 of the fixed former units. Since the plate 81 offers resistance to a very free movement of the metal strip, and the latter being very thin and therefore flexible, sharp corners will easily be formed where the metal passes about the edges of said fingers 54, it will lie flat against the faces thereof, and will extend in a straight line from the upper edge of the fingers 54 to the outer end of the feed plate 40, as clearly shown in Fig. 8.

This rolling over of the formers occupies about 40° of rotation of the shaft 2, at which time the movement ceases due to the arrival of the arm 37 at the upper end of its stroke.

Shortly after this point, the lowermost point of the head 50 engages the metal 51 between the feed plate and the oscillating formers, pressing the metal down and causing a further feeding of the metal from its spool.

As the head continues its descent to the bottom of the stroke, it gradually presses the metal so the latter conforms to the contour of the surfaces against which it is impressed.

The shoulder 70 and portion 71 of the head press the metal down with a right angle bend so that it lies against the outer edge of the feed plate and the adjacent surface of the table 38 the corners or edges of the head on each side of the slot 77 press the metal into the depression on both sides of the die 63; the sloping surface 72 of the head presses the metal flat against the correspondingly sloping sides of the former fingers 54 and 55 and the fixed finger 59, while the die 75 enters the grooves 57 in the fingers 54, pressing the metal into the grooves. This is all plainly shown in Fig. 9.

The grooves in the fingers, and head, and the corresponding dies, do not extend for the full width of the metal, so that in the finished core the depressions 80 (see Fig. 15) are formed which are set in from the edges of the metal, as is necessary in radiator construction, these depressions or recesses forming the water passages in the radiator.

This pressing operation of course is completed when the head reaches the bottom of its stroke, and as it again starts to rise, the pressed metal remains immobile in the shape or formation given it by the head.

Now with the continued rotation of the shaft 2, the head 50 begins to move upwardly. With this upward movement, the sliding heads 9 are first moved out so that the former fingers are disengaged from the work; the oscillating formers are then rolled out and back to their normal position; and the feeding of the metal forward then commences, as described at the outset of this description of operation.

It will be noted and evident that these different movements, with the upward travel of the die head, take place in the same order, and for the same duration of time or degree of rotation of the shaft, as had taken place with the downward travel of the head, since while the direction of travel of the arms 19 and 37 is now reversed, and they are on their downward stroke, the arrival of the arm 19 (which controls the moving out of the sliding heads and formers) at the lowermost point of its stroke, is still ahead of the arrival of the arm 37 at the same position, the latter arm controlling the oscillating or rolling out of the formers.

It will be noted that the vertically movable plate 61, which was depressed by the fingers 59 when the sliding heads were moved inwardly, is again released with the moving out of said fingers. This plate then is free to rise to its normal position, and in doing so presses up on the corner of the metal or work adjacent the die 63, and raises the work up, so that when the feeding recurs, the corner of the work on the side of the die 63 adjacent the feed plate is free to pass thereover.

One cell 56 has thus been formed, as shown in Fig. 9, and others partly shaped.

Now with a further feeding forward of the work, and the moving in of the formers, the cell already completed is engaged by the fixed fingers 66 (see Fig. 10,) and the vertical bend pressed adjacent the outer end of the feed plate 40 is moved to be engaged between the oscillating former fingers 54 and 55, while the recess or groove 80 previously formed by the die 63 is moved to lie intermediate the fingers 67 and fingers 65.

Then when the oscillating formers again roll out, the grooves 58 in the fingers 55 receive the said depression 80 therein, the metal forming another cell is wrapped completely about said fingers 55 and partly about the fingers 54, extending from the apex thereof to the plate 40 in a straight line as before, and as shown in the present instance in Fig. 11, ready for the descent of the die ahead to again press the work into its proper shape.

With the recurrence of another feeding operation the first formed cell passes beyond the range of the formers and under the guide fingers 78ª; the adjacent diagonally disposed cell passes into alinement with the fixed former fingers 66 to be engaged thereby; while the rearmost and lower cell moves into alinement with the lower fixed fingers 65, to be likewise engaged thereby.

With every feeding forward of the the metal, the completed cells move forward from alinement with one set of fingers to the next, and so on.

The die 76 in the head does no initial pressing, but merely enters and finishes if necessary the formation of the recess 80 previously formed by the dies 63 and 75 when the cell bearing such recess moves into alinement with the fingers 66.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent, is:

1. In a metal bending machine, a base, a pair of longitudinally alined heads carrying formers thereon both slidably mounted for opposed movement on the base, a disc mounted on the base under the heads, opposed rods pivotally connected to the disc and to the heads and means for rotating the disc whereby opposed movement is imparted to the heads.

2. In a metal bending machine, a pair of heads slidably mounted for opposed movement, independent and alined shafts turnably mounted in the heads, oscillating formers fixed on adjacent ends of the shafts, arms projecting outwardly from the latter, rods connecting the corresponding arms, lever means arranged for movement at an angle to the arms and positioned at right angles to the movement of the heads, slidably and turnably mounted on the rods, and means for imparting opposed movement to the heads.

3. In a metal bending machine, a pair of heads slidably mounted for opposed movement, independent and alined shafts turnably mounted in the heads, oscillating formers fixed on adjacent ends of the shafts, arms projecting outwardly from the latter, rods connecting the corresponding arms, lever means arranged for movement at an angle to the arms and positioned at right angles to the movement of the heads, and passing about the rods, balls slidably mounted on the rods and turnably socketed in the adjacent ends of the lever members, and means for imparting opposed movement to the heads.

4. In a metal bending machine, a pair of heads slidably mounted for opposed movement, independent and alined shafts turnably mounted in the heads, oscillating formers fixed on adjacent ends of the shafts, arms projecting outwardly from the latter, rods connecting the corresponding arms, levers arranged for horizontal movement at an angle to the arms and positioned at right angles to the plane of movement of the heads, balls slidably mounted on the rods, links in which said balls are freely socketed pivotally connected to the adjacent ends of the levers, and oscillatory guide sleeves through which said levers pass.

5. In a metal bending machine, a table to support the material, said table having a transverse depression, a vertically movable die head arranged to press the material into the depression, a spring-pressed plate in the depression under said material, and normally near the top of said depression, and fingers mounted for movement lengthwise of the plate adapted to engage and depress the plate prior to the descent of the head to press the metal.

6. In a metal bending machine, a table to support the material, said table having a transverse depression, a vertically movable die head arranged to press the material into the depression, a spring-pressed plate in the depression under said material, and normally near the top of said depression, fingers adapted to move toward the plate and to then engage and depress the same, and means for so moving the fingers, said means being timed with the movement of the head to move the fingers toward the plate as the head descends, and to cause a reverse movement of said fingers away from the plate as the head retreats, whereby the plate is released and free to rise under and bear on the pressed material and clear the same of the die.

7. In a metal bending machine, a fixed triangular finger whose apex lies in a vertical plane and whose sides include a right angle, a fixed former unit mounted forward of said finger, said former comprising a plurality of square fingers spaced slightly apart, and arranged with their rear faces in alinement with each other and which if extended would project to the lower edge of the adjacent side of the fixed finger and include a right angle therewith, an oscillating former normally mounted ahead of the fixed finger, such former comprising a pair of square fingers spaced slightly apart and normally positioned in horizontal alinement with the lower forward edge of the forward finger and substantially in alinement with the apex line of the fixed finger, and the axis of rotation of the former being at said edge, and means for oscillating said former forwardly about said axial line through an arc sufficient to move the faces of the oscillating former fingers previously underneath into alinement with the rear face of the fixed finger, and the faces of said oscillating former fingers previously uppermost into engagement with the rearmost face of the fixed former finger.

In testimony whereof I affix my signature.

ROBERT ROY SWANEY.